United States Patent
Morrison

(10) Patent No.: US 10,497,053 B2
(45) Date of Patent: Dec. 3, 2019

(54) AUGMENTED REALITY E-COMMERCE

(71) Applicant: 3D Product Imaging Inc., Seattle, WA (US)

(72) Inventor: Darrick Morrison, Seattle, WA (US)

(73) Assignee: 3D Product Imaging Inc., Seattle, WA (US)

( * ) Notice: Subject to any disclaimer, the term of this patent is extended or adjusted under 35 U.S.C. 154(b) by 708 days.

(21) Appl. No.: 15/053,235

(22) Filed: Feb. 25, 2016

(65) Prior Publication Data

US 2016/0253746 A1    Sep. 1, 2016

Related U.S. Application Data

(60) Provisional application No. 62/121,779, filed on Feb. 27, 2015.

(51) Int. Cl.
*G06Q 30/00* (2012.01)
*G06Q 30/06* (2012.01)

(52) U.S. Cl.
CPC ..... *G06Q 30/0643* (2013.01); *G06Q 30/0625* (2013.01)

(58) Field of Classification Search
CPC .................................................. G06Q 30/0643
USPC .................................. 705/26.1–27.2, 26.62
See application file for complete search history.

(56) References Cited

U.S. PATENT DOCUMENTS

| 2008/0071559 | A1* | 3/2008 | Arrasvuori | G06Q 30/06 705/26.1 |
| 2010/0138296 | A1* | 6/2010 | Ramer | G06F 17/30867 705/14.52 |
| 2012/0062596 | A1* | 3/2012 | Bedi | G06Q 30/0256 345/633 |
| 2013/0007875 | A1* | 1/2013 | Jakobsson | G06F 9/454 726/19 |

(Continued)

FOREIGN PATENT DOCUMENTS

WO    2015023630 A1    2/2015

OTHER PUBLICATIONS

"Integrate." Dictionary.com, Dictionary.com, www.dictionary.com/browse/integrate#.*

(Continued)

*Primary Examiner* — Jason B Dunham
*Assistant Examiner* — Arielle E Weiner
(74) *Attorney, Agent, or Firm* — Han Santos, PLLC

(57) ABSTRACT

An augmented reality e-commerce platform may present 3-dimensional (3D) representations of products to a user in an augmented reality environment. In response to a query from a user that is initiated from within an augmented reality environment, image data and product data for a 3D production representation of the product are retrieved from a data store. The image data and the product data are compiled into an integrated file for rending the 3D product representation. The product data may include points of interest that are to be overlaid onto the 3D product representation rendered via the integrated file. The integrated file is used to render the 3D (Continued)

product representation of the product in the augmented reality environment. The augmented reality environment may shows one or more real world physical objects along with the 3D product representation, in which the 3D product representation is overlaid with the points of interest.

20 Claims, 7 Drawing Sheets

(56) References Cited

U.S. PATENT DOCUMENTS

| | | | |
|---|---|---|---|
| 2013/0174195 A1* | 7/2013 | Witenstein-Weaver | H04N 21/4722 725/32 |
| 2014/0095524 A1* | 4/2014 | Fleischman | G06Q 10/02 707/759 |
| 2014/0129329 A1* | 5/2014 | Sekine | G06Q 30/0251 705/14.53 |
| 2014/0222558 A1 | 8/2014 | Spivack | |
| 2015/0032838 A1* | 1/2015 | Demsey | H04L 67/2842 709/213 |
| 2015/0040074 A1 | 2/2015 | Hofmann et al. | |
| 2015/0123965 A1* | 5/2015 | Molyneaux | G06T 19/20 345/419 |
| 2016/0098403 A1* | 4/2016 | Lee | G06F 17/3053 707/749 |

OTHER PUBLICATIONS

Olsson, T., Lagerstam, E., Kärkkäinen, T., & Väänänen-vainio-mattila, K. (2013). Expected user experience of mobile augmented reality services: A user study in the context of shopping centres. Personal and Ubiquitous Computing, 17(2), 287-304. (Year: 2013).*
"International Search Report and Written Opinion" for PCT Application No. PCT/US2016/019934, dated May 2, 2016, 12 pages.

* cited by examiner

AUGMENTED REALITY E-COMMERCE

CROSS REFERENCE TO RELATED PATENT APPLICATION

This patent application claims priority from U.S. Provisional Application No. 62/121,779, filed Feb. 27, 2015, which application is hereby incorporated in its entirety by reference.

BACKGROUND

There are many techniques to generate illusions, or specifically to present artificial experiences over an observer's experiences. An artificial experience may enable an observer to experience a surrounding space by observing and interacting with an artificial environment, as well as the objects that are in that environment.

Illusion techniques may relate to how to position imagery within an environment. For example, the Pepper's Ghost illusion uses half mirrors or semi-reflective glass panes to present images next to physical objects. Illusion techniques may also relate on how to animate imagery. With the advent of computerized graphics, there are an ever increasing number of illusion techniques relate to computer animations. For example, the Pinball 2000™ platform from Williams™ uses Pepper's Ghost techniques to display computer generated objects not only next to pinball bumpers and obstacles, but also to interact with the pinball in motion.

Accordingly, objects in an environment may be fully computer generated, and such objects may be referred to as virtual objects or virtual items. Further, a computer generated environment is called a virtual environment. In contrast, real world items are called physical items. The real world comprises a physical environment and physical objects. While physical items may be called real items in some contexts, the term "physical" is used in this patent application to prevent confusion in referring to objects in augmented or virtual "reality" environments and objects in the "real world."

The technique of overlaying animated virtual objects, over physical objects and a physical environment, is called augmented reality. Specifically, an observer's experience in the physical world may be augmented with computer animations presented in observer's context. Thus, the addition of virtual objects not only add to the observer's experience, the virtual objects may become relevant to the observer's activities at that time.

Augmented reality is distinct from virtual reality. Augmented reality overlays virtual objects over the physical world. In contrast, virtual reality is comprised solely of virtual objects and generally is a completely virtual experience. For example, Google Glasses™ allow an observer to perceive the physical world through glasses, but overlay virtual objects over the glasses to augment the wearer's experience. In contrast, Oculus Rift™ displays solely virtual objects. In order for the wearer to perceive the physical world in augmented reality, cameras that stream video of the physical world may overlay images of the physical world into the wearer's virtual world.

With the rise of the Internet and e-commerce, searching, inspecting, and purchasing objects via a computer over the internet has become a daily experience. With the ubiquity of computing resources and multimedia capture devices, e-commerce experiences have been the subject of augmented reality. For example, Lego™ stores have computer screens such that when a customer holds an unboxed Lego kit, the screen shows the customer holding the box with an animated virtual constructed kit on the box. As the customer moves the box, the virtual objects move as well, thereby providing the customer with a degree of manipulation control over the virtual objects. However, present augmented reality experiences are still rudimentary and limited, and subject to improvement.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Context of Augmented Reality for E-Commerce—Definitions

Preliminary to proceeding with the detailed description, the following term definitions are provided:

360° Spin Representation—Model data for a virtual object so that it may be viewed from any angle, where an observer may move around the object, and where the mounting is not visible. A consequence of 360° spin representation is that it is more difficult to create content since mounts are harder to hide, and non-rigid objects have to be made rigid.

Augmented Reality—The overlaying of virtual objects and/or other virtual experiences over the physical environment and/or physical objects in the context of an observer's activities.

Brand Data—Product promotional data from the manufacturer of a product, which may include: logos, endorsements, and coupons.

Environment—The area surrounding an observer providing context and a locale for objects for the observer to interact with.

Immersion—Completely surrounded with a virtual environment and virtual objects. For example the Oculus Rift™ provides an immersive virtual experience.

Model—A graphical three-dimensional (3D) virtual object to be rendered.

Model Data—The data used to render a Model. Model data may comprise: objects, meshes, textures, and/or shaders.

Next Best Thing (NBT)—A virtual object model data representation with fidelity less than 360° spin representation. NBT is a resolution fallback when a computer client does not support 360° spin representation.

Overlay—The adding of virtual objects to a physical environment. For example, Google Glasses™ overlays virtual objects over the physical environment as perceived through the glasses.

Photorealism/Photorealistic—The quality of being visually indistinguishable from physical objects.

Product Data—Data specific to a product to be sold, which may include: product name, Stock Keeping Unit (SKU), price, Universal Product Code (UPC) number, and branding data.

User Generated Content—Product data from created by customers and may include: multimedia reviews, ratings, and unboxing videos.

Virtual Reality—A computer generated experience comprising a virtual environment and virtual objects.

WebGL—A standard Application Programming Interface (API) to render graphics. When a viewer or rendering platform does not support WebGL, or where platform support is lacking, a platform may support fallback to other alternative graphical APIs.

Overview of Augmented Reality E-Commerce

Figure 1:
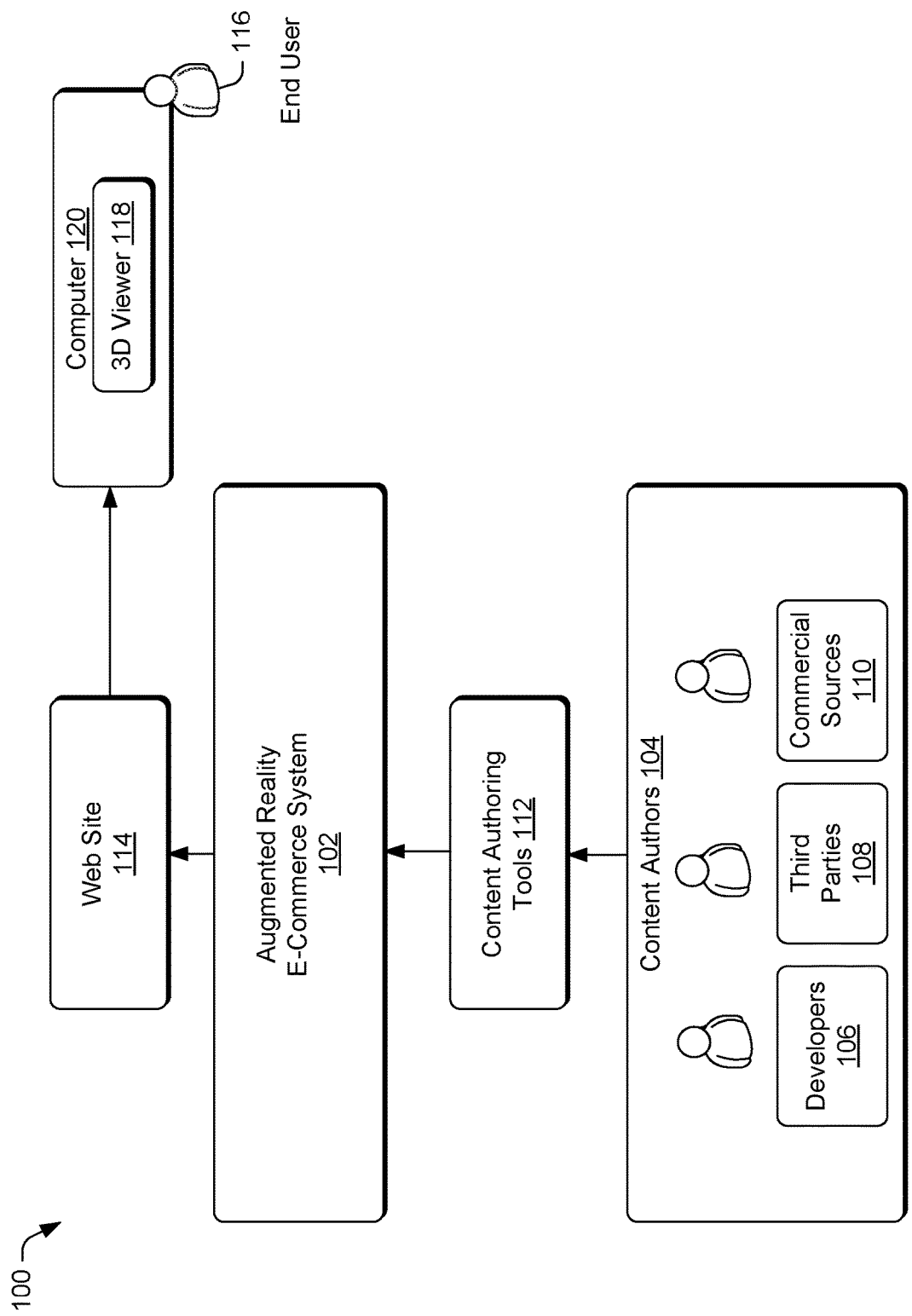
FIG. 1 is a top level diagram illustrative of augmented reality e-commerce.

An augmented reality e-commerce platform may be conceived as a content management system. Content is initially authored and maintained, content is then served upon request, subject to various constraints, to an intermediary such as a web site. Subsequently, the content is rendered to an end user. Service of content is generally metered, billed, and audited. These processes are illustrated with respect to FIG. 1, a context diagram for augmented reality e-commerce 100.

The augmented reality e-commerce platform 102, also referred to simply as platform, receives content from content authors 104. Content authors 104 may be developers for the platform 102, third parties 108, or commercial sources such as retailers and manufacturers 110. Content authors 104 may use standard content authoring tools 112 to develop content prior to upload to the platform 102. The content authoring process is described in greater detail with respect to FIG. 5.

The augmented reality e-commerce platform 102 serves content based on requests from a consumer facing web site 114. The augmented reality e-commerce platform 102 may take on many manifestations, one of which is a content management system by itself, others are the content management system combined with other infrastructure. The content management system and the surrounding infrastructure are discussed in further detail with respect to FIG. 2. The web site 114 is generally making requests in response to requests from an end user 116, where the end user is operating an augmented reality viewer 118, coupled to a computer 120, which in turn is accessing the web site 114. The service of content process is described in greater detail with respect to FIG. 4.

As mentioned above, the web site 114, makes requests of the augmented reality e-commerce platform 102, based on requests from an end user 116. The web site 114 generally does not merely forward requests from end user 116. Rather, the web site 114 constructs an augmented reality experience by using the content served from the platform 102 as virtual objects to overlay over the physical environment and objects observed by the end user 106. The logic as to what virtual objects to overlay, and how, generally resides in the web site 114. The process to generate and present an augmented reality end user experience is described in greater detail with respect to FIG. 6.

The various entities interacting with the augmented reality e-commerce platform 102 may be interested in collecting metrics regarding the end user and others, and then performing statistical analyses on the metrics. This process, known as analytics, may enable the various entities to evaluate their processes. For example, manufacturers and retailers may evaluate sales, as well as the interactions of the end users 116 with their products and presentations. Content authors may choose to modify content based on feedback from end users 116. The platform itself 102 may use feedback from the end user 116 to optimize services. Analytics for the e-commerce augmented reality platform is described in further detail with respect to FIG. 7.

Exemplary Hardware, Software and Communications Environment

Figure 2:
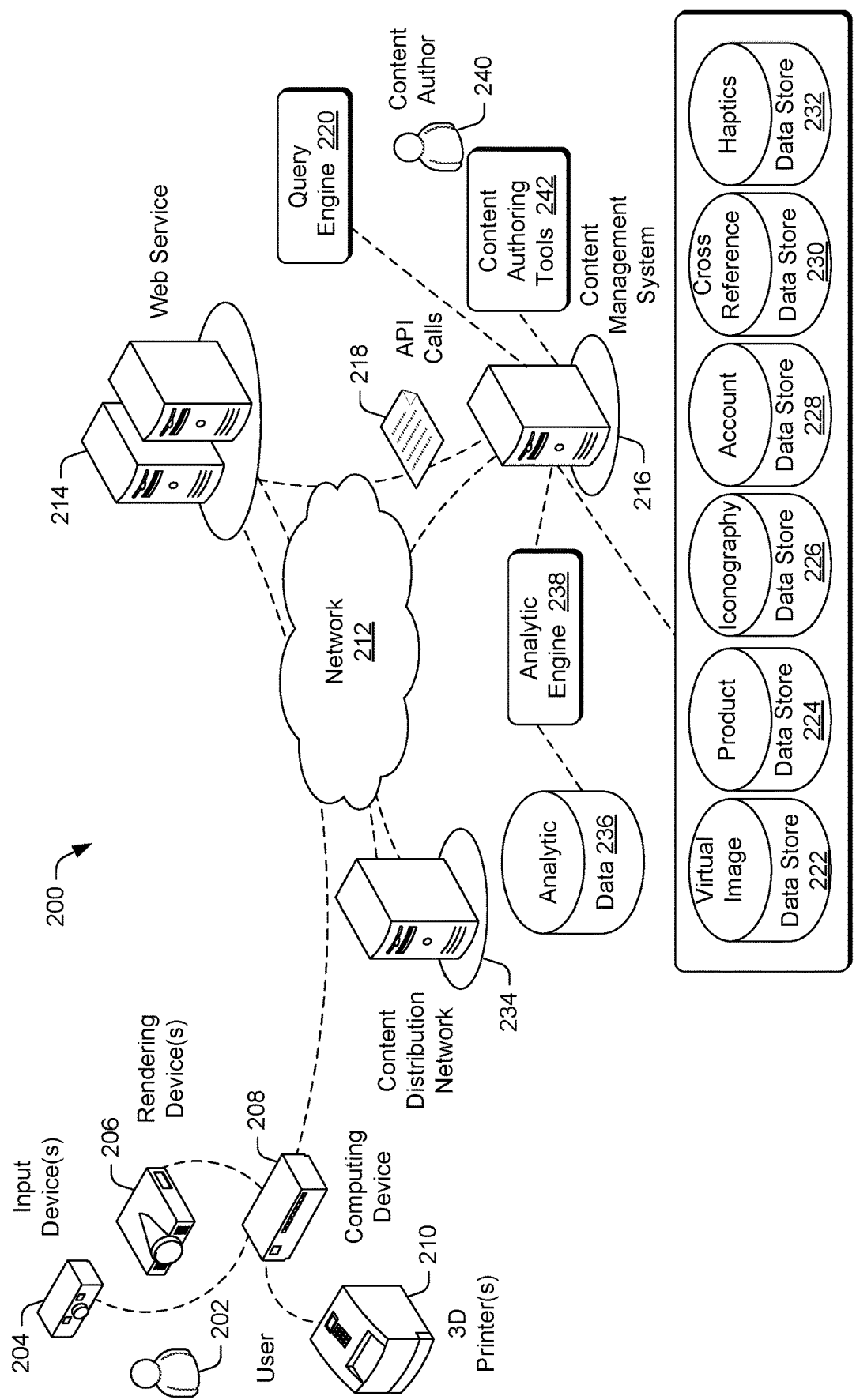
FIG. 2 is a diagram of an exemplary infrastructure for augmented reality e-commerce.

The hardware, software and communications environment is describe with respect to FIG. 2. Specifically, FIG. 2 is an infrastructure 200 of an exemplary hosting environment for augmented reality e-commerce. The exemplary hosting environment may include one or more computing devices, such as servers and client side devices. Each of the computing devices may include a communication interface, one or more processors, memory, and hardware. The communication interface may include wireless and/or wired communication components that enable the server to transmit data to and receive data from other networked devices. The hardware may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

Requests to the augmented reality e-commerce platform may be initiated from a client side device. A client side device may be any device with a processor, memory, and a network connection sufficient to connect to a cloud server, either directly or via the Internet. Typically there may be an operating system. Typical configurations are a central processing unit, RAM, and Wi-Fi or Ethernet connectivity. The memory may be computer-readable media and/or may have access to other computer-readable media, as described below, and may run a client application comprised of computer executable code resident in the memory and/or other computer-readable media.

Similarly a server, including a cloud hosted server, may be device with a processor, memory, and a network connection sufficient to connect to a client device or other server either directly, or via the Internet. As with a client device, typically there may be an operating system. Typical configurations are a central processing unit, RAM, and Wi-Fi or Ethernet connectivity. As with the client device, the memory may be computer-readable media and/or will have access to other computer-readable media, and may run one or more server applications comprised of computer executable code resident in the memory and/or other computer-readable media.

A server, including a cloud server, generally runs a virtualization environment that may create virtual machines. In each virtual machine, there may be an operating system, or system level environment. Each virtual machine may spawn processes, each of which may support at least one application. An execution environment such as a Java Virtual Machine, or .NET™ runtime may execute in a virtual machine and manage processes and threads.

Turning back to infrastructure 200 of FIG. 2, end user 202, or user for short, has access to a platform capable of accessing the internet and participating in augmented reality. There may be input devices 204, such as cameras, rendering devices 206, a computing device 208 of an end user, and/or a 3D printer 210.

Input devices 204 may operate as part of the rendering devices 206, or may simply be input devices tracking the user 202 or the environment of the user 202. For example, a rendering device 206, may be Google Glasses or may be an augmented computer monitor. The glasses may have a camera to track what the user 202 is viewing. To do so, input devices 204 may include a head tracking depth sensor, eye tracking depth sensor, a microphone to listen for voice command, or other cameras to detect the user's gestures, reactions, and facial expressions.

Since the infrastructure 200 may support gesture input, input devices 20, such as cameras, may be trained on the user 202 to detect gestures. Furthermore, in the case of cameras used to detect the user's reactions and facial expressions, the input devices 204 may thereby be used to collect input for a cognitive modeling based analysis to determine the user's positive or negative attitude towards the augmented reality environment and objects rendered.

Input devices 204 may further include environmental cameras to detect lighting within the user's physical environment. Input devices 204 may also include microphones and environmental sensors. For example, microphones may be used as an input for noise cancellation to mute unwanted physical world sounds. A temperature sensor could be used to detect temperature which in turn could be used as an input to select virtual environment visual settings.

The client side portion of the infrastructure 200 is agnostic to input devices. The infrastructure 200 may equally support both virtual reality and augmented reality rendering devices 206. Accordingly, the infrastructure 200 may equally support immersion or overlay rendering devices 206. Rendering devices 206 are not limited strictly to video rendering via video screens. Rendering devices 206 may include haptic gloves that provide haptic feedback, mechanical devices that provide force feedback, and speakers that render sound.

Input devices 204 and rendering devices 206 are communicatively coupled to a computing device 208. Logic to handle input and output, including device drivers and client applications are resident in computing device 208. Logic may include logic to parse gestures from a rendering device 206 thereby to create computer commands. Logic may include logic to identify alternative forms of input, for example in support of the Americans with Disabilities Act (ADA).

In the case of ADA logic, a user 202 may set a preference in user logic to select modalities of input, or a set of predefined visual or auditory inputs comprising a distinct set of expressions. One modality may be finger gestures, another modality may be arm gestures, and a third modality may be voice commands. The logic stores a master set of computer commands. Each computer command corresponds to a computer routine or set of routines that are to be executed when the respective computer command is invoked. A user 202 may select a modality which creates a default mapping of the inputs comprising the modality to the master set of computer commands. Thus when the input is performed, the corresponding computer command is invoked, and the respective routine or routines are executed. The mapping of individual gestures to commands may be edited by the user 202 via a utility that allows manual mapping. Gestures from different modalities may be combined in a custom modality. For example, voice commands may be used for some computer commands and arm gestures for others.

Computing device 208 may also be communicatively coupled to other devices such as a three-dimensional (3D) printer 210. A 3D printer comprises on or more heated nozzles feeding filament, typically plastic, and is used to create a sculpture as specified in a virtual file. Thus, the 3D printer 210 may be used to turn virtual objects into physical objects while being subjected to scale and material constraints.

Web Service Overview

The client side components of the infrastructure 200 has access to a network 212, usually the internet, and thereby may access a web service 214. A web service 214 may be a web site for a manufacturer, retailer, or another third party, where user 202 may browse goods for potential purchase. The web sites provided by the web service 214 may generally encapsulate logic to serve virtual goods, to track user accounts, to track and fulfil sales, and other commercial activities. To support these activities, the web service 214 will access virtual object assets and other assets from a content management system 216 over a network 212 via API calls 218. The API calls 218 are described in further detail with respect to FIG. 3. Generally, the content management system 216 may be owned by another entity. Accordingly, the web service 214 may render payments to the content management system 216.

The web service 214 may serve virtual objects via WebGL. However, if the web service 214 detects that either the user's rendering devices 206 or computing device 208 do not support WebGL, or if there are communications limitations, the web service 214 may encapsulate logic to fallback to alternative graphical rendering languages or representations. The web service 214 may determine that WebGL is not supported in various ways. For example, the determination may be made via a user profile setting, a user selection from an application, or via querying an application resident on the computing device 208.

Content Management System Overview

The content management system 216 is generally resident on a cloud provider, but alternatively may reside on local servers that are a part of a local area network (LAN). Upon receiving an API call from web service 214, such as a web site, the content management system 216 may service the request. The APIs are described in further detail with respect to FIG. 3. If the request is a query, a query engine 220 may be invoked. Alternatively, a query engine 220 may be resident in web service 214.

The API request may result in the content management system 216 accessing at least one of the data stores 222-232 to serve the request. Where the request is to serve data, the content management system 216 may serve data on a content distribution network 234 for subsequent access by the web service 214.

Data Store Overview

The content management system 216 may make use of one or more data stores. The data stores may include a virtual image data store 222, a product data store 224, an iconography data store 226, an account data store 228, a cross reference data store 230, and a haptics data store 232. The virtual image data store 222 comprises all the data to display a virtual object. Virtual images are often referred to as virtual models, virtual assets, or models. Model data is the data used to render a model. The virtual image data store 222 comprise the identities of the models and the model data. Model data may include object files, rigging, meshes, textures, shaders, haptic textures, as well as other image data. In some cases, the data may be preprocessed in order to save processing time during rendering. Furthermore, provenance and versioning data may be associated with the models.

One feature supported by the virtual image data store 222 is an association with optional features for a product. Consider a product such as a chair. The chair may have different colors, textures, sizes, materials, or other options. The chair may be virtually modified by rendering with a selected option. In the case of model data, some features may be added. For example, one version of a chair may have arms, and the another version may not. Instead of creating model data of two separate chairs, the armless version may be stored and the arms virtually added during rendering. The model data for the option, in this case the arms, would be associated with the model data for the armless chair. When the user 202 selects the arms option, the content management system 216 would retrieve the virtual image data store 222 for the arms. Some options may provide localizations with respect to language, geographical region, and/or other factors. For example, a rendering of a television may display either American English sample content or Japanese sample content depending on the locale and preferences of a user 202.

The product data store 224 comprise the commercial data associated with a model. In various embodiments, the product data store 224 may include product names and identifiers such as UPC and SKU identifiers. The product data store 224 also includes user generated content such as ratings, reviews, metadata and links to relevant content such as unboxing videos, and other multimedia reviews. Product data may also include branding data, which is data provided by the manufacturer including logos, brand names, endorsements, and coupons.

A feature supported by product data store 224 is a point of interest system. Specifically, a model may have points of interest to be called out to potential consumers, such that the user can obtain more information about that point of interest. The identity of the points of interest as well as the additional information content is stored as product data store 224. By way of illustration, consider a shirt in the form of a model. It may be useful to have a point of interest to a seam that uses double needle tailoring. The product data store 224 may cross reference a point on the model, and associate a discussion of double needle tailoring in the context of the shirt. Accordingly, when a particular command from an end user 202 to show the additional content is received, the content is retrieved from the product data store 224.

The iconography data store 226 comprises the set of data used to represent prompts and dialogs with a user. In at least one embodiment, the iconography data store 226 comprises user interface data, which may include user gesture patterns, mappings of gestures to user actions, data to enable behavior recognition via cognitive or other models, icons, common dialog boxes, common menus, standard widgets and gadgets.

Accordingly, the iconography data store 226 enables the provision of a consistent user experience. For example, visual cues such as icons may be overlaid a model, and since the visual cues all come from the same iconography data store 226, a user 202 may become trained to recognize available options and activities indicated by the visual cues.

The iconography data store 226 stores all identity information for a web service 214. Generally, the iconography data store 226 may be used to pay for assets that are served to the web service 214 by the content management system 216. Accordingly, the iconography data store 226 may include identity/account information, links to a method of payment, and preferences. In some cases, the web service 214 may also store identity/account information, links to a method of payment, and preferences, of end users 202 as well. This enables the possibility of the content management system 216 providing fulfillment and tracking of transactions at the end user fidelity level.

The cross reference data store 230 enables the linking of virtual image data store 222 to the product data store 224 or other third party data. The cross referencing may be via a UPC, a SKU, or other indices. Furthermore, the cross reference data store 230 may also be cross referenced by a web service identifier, an end user identifier and/or a date time stamp. In this way, the data infrastructure for the content management system 216 may track all transactions of served data on a per web service, per end user, and/or per transaction basis.

In some embodiments, a further degree of detail may be stored by the cross reference data store 230. The web service 214 may track all input actions via input devices 204 by end user 202. Thus, the cross reference data store 230 may store a cross reference between one or more input actions in sequence and an action by the end user 202. In this way, the content management system 216 can correlate any action by an end user 202 to any transaction or sequence of input actions. This cross reference data may be later used for performing various analytics.

One of the input devices 204 used by the end user 202 may be a haptic glove or other haptic feedback peripheral. Accordingly, the haptics data store 232 may store texture information that enables haptic textures to be encoded onto virtual image data store 222 or product data store 224. The haptic texture library may include one or more haptic textures. Each haptic texture may comprise a plurality of substantially flat polygon with one or more raised surfaces. Each polygon may have a predefined density of raised surfaces. A smooth surface may have little to no raised surfaces, whereas a rough surfaces may have a high density. Similarly, the amplitude of the raised surfaces may be specified. Smooth surfaces may have relatively low amplitudes, but rough surfaces may have relatively high amplitudes. The slope of a raised surface may also be stored. Steep slopes may represent prickly surfaces whereas shallow slopes may represent pebbled surfaces. The degree of give that a surface provides may also be stored. High degrees of give tend to be sticky, whereas low degrees of give tend to be merely rough.

In some embodiments, the polygons stored in the haptics data store 232 may be tessellated over a surface. In such embodiments, the same polygon may be flagged to repeat in a tessellation over a large surface, and may be flagged to have the orientation of the polygon randomly positioned. Further, since surfaces are not necessarily uniform, the haptics data store 232 may support overlay maps where the overlays indicate raised surfaces or depressed surfaces. In this way, scratches on a surface, or ridges of a surface may be expressed.

During the rendering a surface, the surface may be first subdivided into different zones indicating different types of textures. One or more patterns and a polygon density for each zone may be selected. The polygons are then tessellated onto the surface. If the repeat or random orientation flags are set, the patterns may be set accordingly. If an overlay is specified, the overlay may be implemented to cover the surface, and scratches and ridges are rendered accordingly.

Analytics Platform Support Overview

The content management system 216 is enabled via the cross reference data store 230, as well as the other data stores, to track any and all 3D action by an end user 202. Accordingly, sequences of actions stored in the analytic data 236 may be cross correlated against transactions and activities by an end user 202 via the cross reference data store 230. By storing a date time stamp on activities, the content management system 216 may track linger times between actions, which in turn may be used as part of cognitive and/or behavioral analysis.

The analytic engine 238 is coupled to the analytic data 236, as well as the other data stores 222-232 of the content management system 216. The analytic engine 238 may provides an administrator with query and statistical analysis capabilities. Such analysis capabilities may enable the administrator to detect behavioral patterns of one or more end users 202.

An important function of the analytic engine 238 is the determination of whether an advertising campaign is successful. For example, the analytic data 236 may indicate that multiple users have viewed a virtual product, such as a shoe. However, the analytic engine 238 may determine that a majority of users that look at the soles of the shoe end up not buying the shoe. A review of the virtual image data store 222 may indicate that the model data of the sole is poorly aligned with the rest of the shoe. Accordingly, the owner of the model data may make the relevant data fixes. Experiences for an end user 202 are generally created by content authors 240. The content authors 240 may use the content authoring tools 242 to create or modify the end user experiences. For example, in the shoe scenario above, a content author 240 may fix the shoe data to provide the end users with a better experience. The content authors 240 may include manufacturers, retailers, and/o other stakeholders. The content creation process is described in greater detail with respect to FIG. 5 below.

Programmatic Overview

Figure 3:
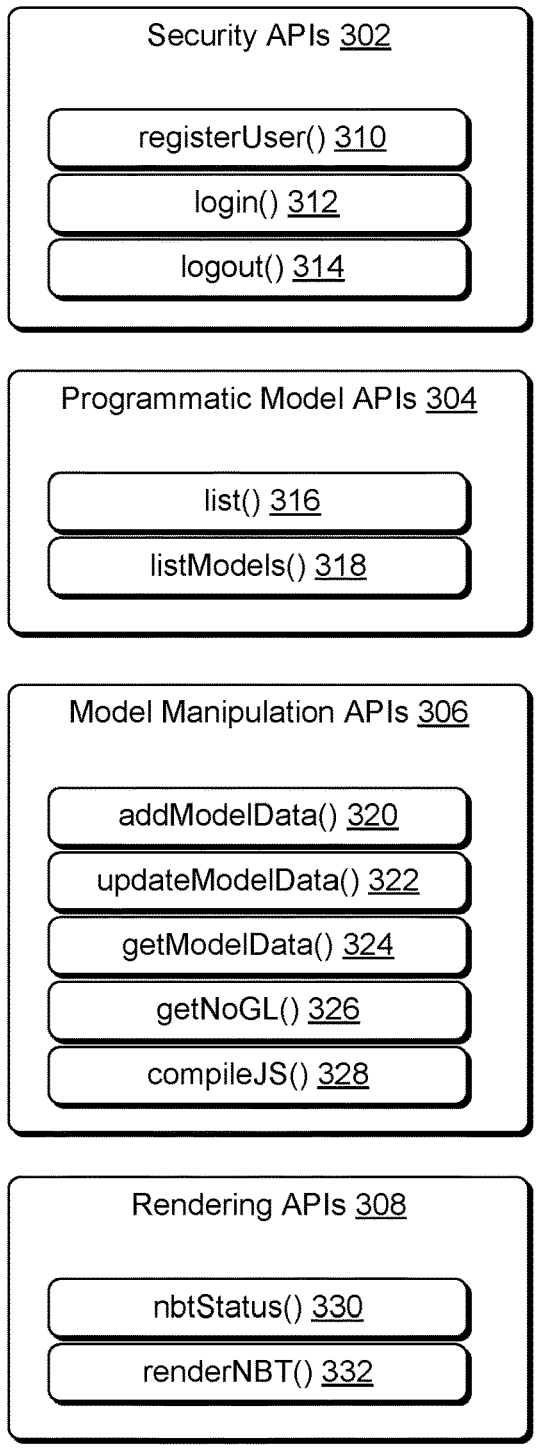
FIG. 3 is a diagram of an exemplary application programming interface block diagram for augmented reality e-commerce.

The content management system 216 exposes its functionality to Web service 214 and other entities via an application programming interface (API). FIG. 3 is a block diagram of the functions exposed via the APIs 300. Specifically, the API exposes at least four blocks of functionality: security APIs 302, programmatic support APIs 304, model manipulation APIs 306, and rendering APIs 308.

The security APIs 302 provide authentication of an account for a party seeking access to the content management system 216. Accounts may be registered or deregistered via the registerUser( ) API 310. Calling this API creates, updates, or deletes data in the iconography data store 226. A session on the content management system 216 may be initiated via the login( ) API 312, and that session terminated via the logout( ) API 314. If the logout( ) API 314 is not called after a predetermined time, the content management system 216 may terminate the session independently.

The programmatic support APIs 304 provide convenience functions for programmers using the APIs 300 for the content management system 216. Programmatic support APIs 304 primarily provide enumeration functions of the APIs 300 and of models. Specifically list( ) 316 enumerates the functions of the APIs 300 and listModels( ) 318 enumerates the models accessible in memory.

The model manipulation APIs 306 provide functions to add, remove, and update data to models as well as to receive models. Specifically the model manipulation APIs 306 include addModelData( ) 320 which allows the uploading of data to a model, and an updateModelData( ) 322 allows the updating of data already in a model. Model data may be retrieved in GL library form via getModelData( ) 324. The retrieved data may include virtual object data such as objects, shaders and textures, product data such as points of interest, pricing, and branding data, as well as slideshow data, scene data, and third party data. However, in the event a client is determined not to support the GL library, the getNoGL( ) 326 function may be called to use non-GL virtual data.

The model data comprise multiple files from multiple sources. Some data may be moderately sensitive. Accordingly, the model manipulation APIs may include compileJS( ) 328 that takes the constituent model data files and makes it into a single file. In some instances, the compileJS( ) 328 may also perform an obfuscation function on the data. The obfuscation function makes it somewhat difficult to reconstruct the data if the data is intercepted.

The rendering APIs 308 provide functions to render data to a known quality of service. Specifically, the nbtStatus( ) 330 method allows a programmer to perform a performance check. Calling renderNBT( ) 332 renders the next best level of quality (NBT) available to a client.

Data Service Process for Augmented Reality E-Commerce

Figure 4:
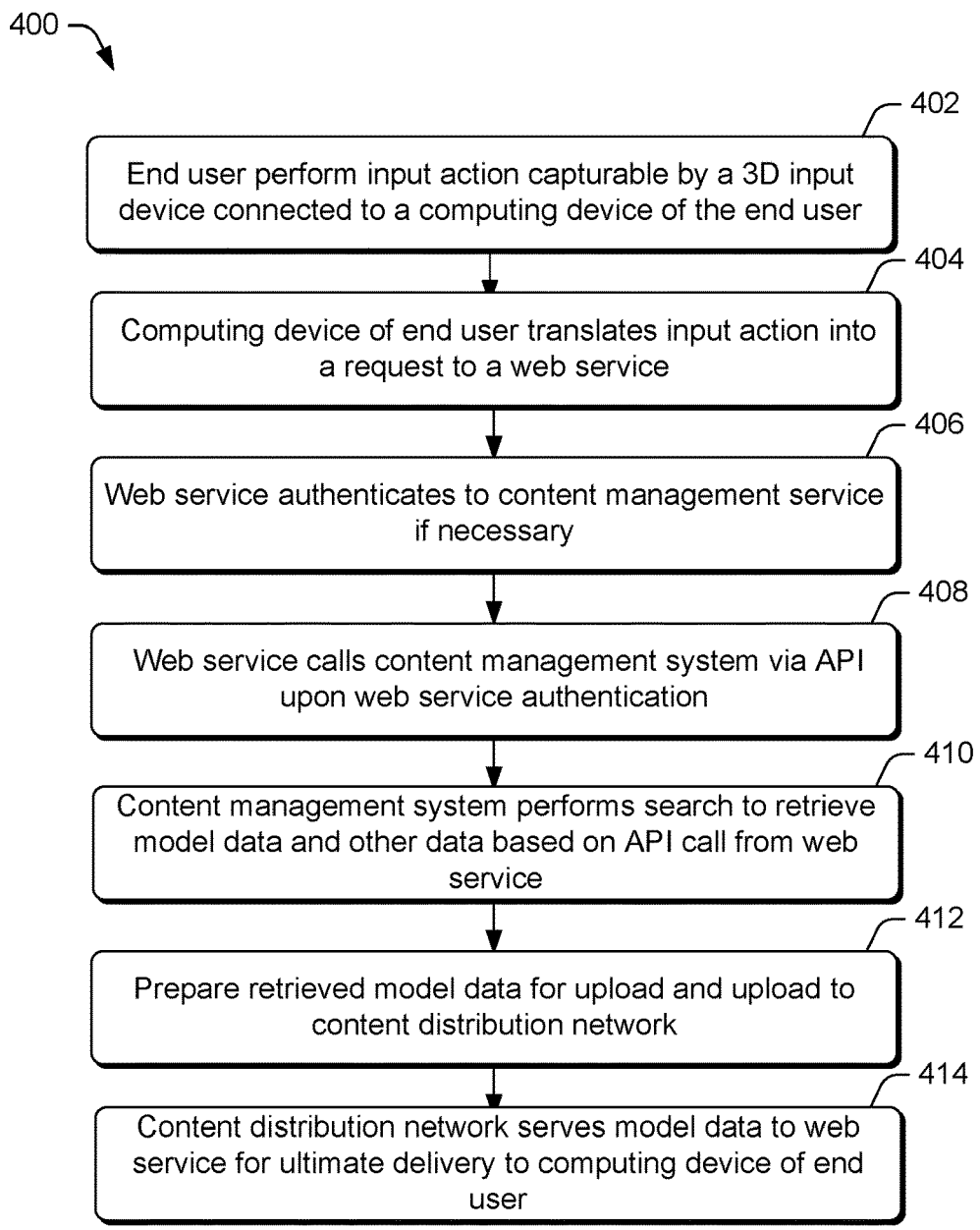
FIG. 4 is an exemplary service of content process for augmented reality e-commerce.

FIG. 4 provides a flow chart illustrating the content service cycle as part of augmented reality E-Commerce. In block 402, an end user 202 provides input via an input device 204. The input may be tracked by client software such as a viewer, or by other tracking software local to the end user at the end user's computing device 208. The end user's computing device 208 is communicatively connected to a web service 214 over a network 212.

In block 404, the client software may translate the input action into a data request for a model to the web service 214. In turn, the web service 214 calls the content management system 216 over the network 212 via one or more calls to the APIs 300. In block 406, if the web service 214 is not authenticated, the web service 214 may create a sessions using the security APIs 302 before proceeding further to block 408. However, if the web service 214 is authenticated, the process 400 may proceed to block 408.

In block 408, the web service 214 may call one or more APIs 300 to retrieve model data. Typically, the model data corresponds to the request for at least one end user 202. Alternatively, requests may be batched to minimize the number of network round trips between the web service 214 and the content management system 216. In block 410, the content management system 216 runs queries via the query engine 220 to retrieve the requested model data from at least one of the data stores 222-232.

In block 412, the content management system 216 constructs a single file for the retrieved model data, and deploys it in content distribution network 234. Alternatively, the content management system 216 may serve the retrieved data model, either as a single file, or in multiple files, directly back to the web service 214. In block 414, the content distribution network 234 serves the retrieved data either to the web service 214 for forwarding to the end user, or potentially directly back to the end user's computing device 208 for rendering via rendering device 206.

Content Authoring for Augmented Reality E-Commerce

Figure 5:
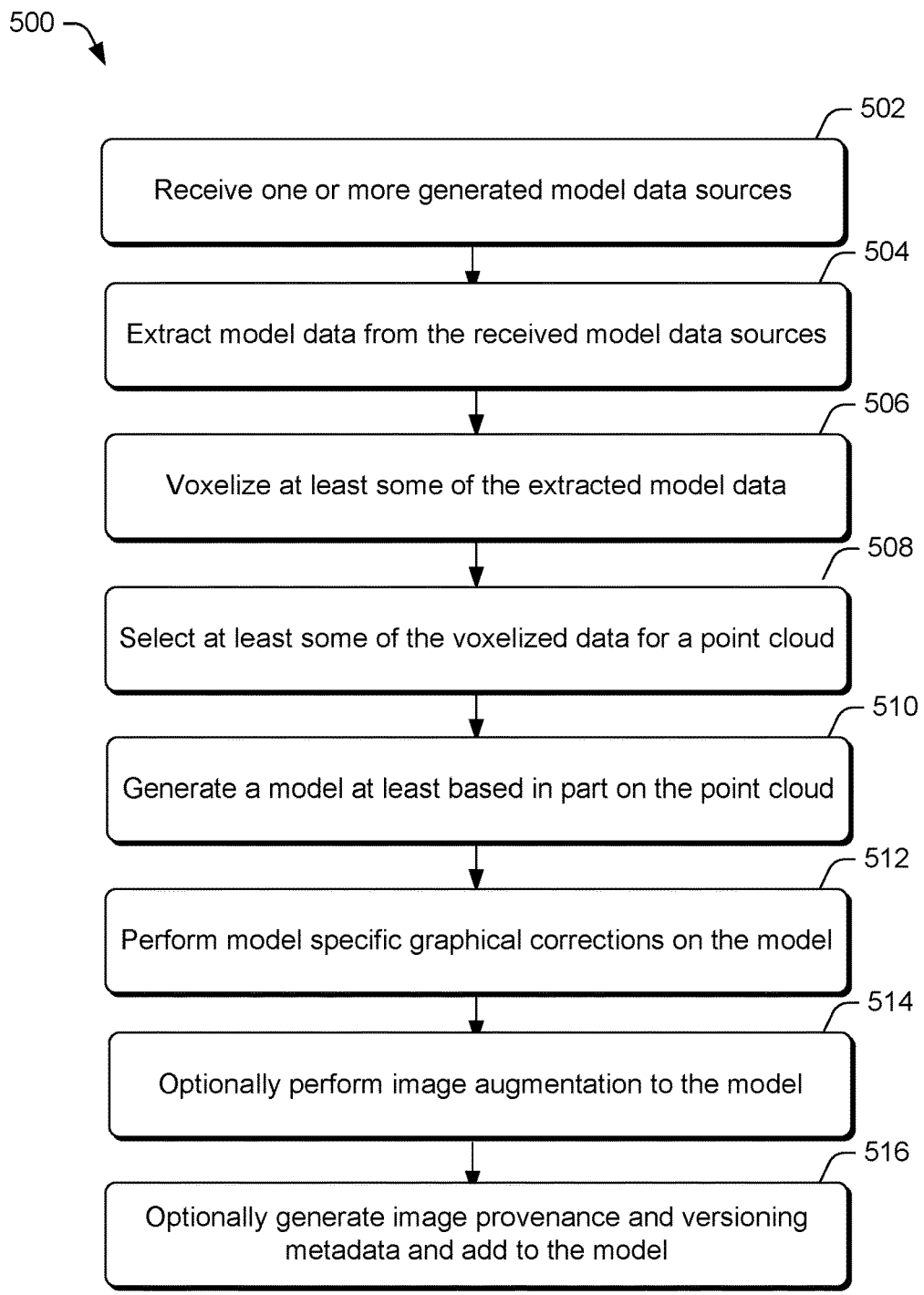
FIG. 5 is an exemplary content authoring process for augmented reality e-commerce.

FIG. 5 is an exemplary content authoring process 500 for augmented reality e-commerce. The virtual image data store 222 comprising the models may be authored by a content author 240 using content authoring tools 242. A virtual image for a single product is a model, i.e. a graphical 3D virtual object to be rendered corresponding to the product. Because a typical manufacturer may have thousands of products, saving five minutes in capturing an individual image may result in a significant time and money savings.

In block 502, one or more sources of model data may be received. A content author or a third-party may provide one or more sources of model data for the generation of a model. Sources may include storage devices or network storage locations that store 3D scans, 2D images, metadata and textual content. A typical case is that the content author 240 is also the person to perform the 3D scans and other data capture. 3D scans may be performed using a standard photometric process. Textures may be captured and edited using standard editors such as Photoscan™, PMVS2 and similar software.

One of the more time intensive steps in generating a model is to ensure the model may be usable as a 360° spin representation. Conventional mounting techniques where mounts are hidden behind the product cannot be effectively used, since the back of the product may be imaged as well. Conventionally, a content author 240 might mount a product from the back, scan the front, then remount the product on the front and scan the back. However this effectively doubles the amount of time to scan the object since mounting accounts for most of the capture time.

In general, anything that can lower the amount of time to perform a scan should be considered. Typically, content authoring tools 242 used in scanning are to utilize higher end graphical processing units (GPU), and to used motion control systems to decrease mounting time.

An alternative mounting technique is to have a boom hold the object with a thread into a light box. Once the object is still, a 3D scan and/or 360° panoramic series of photos may be taken without the mounting being visible, and without multiple mountings being performed.

Soft goods, such as apparel, also present a challenge. Typically, an end user 202 may desire to virtually wear a virtual clothing object. Thus the object cannot be scanned as folded. Rather the object is placed on a special mannequin that is completely covered by the object. For example, a shirt is held in a mount that comprises only a torso and arms as long as the sleeves. This differs from a conventional mannequin that would also show arms, and potentially a head. Accordingly, the specialized mounts would minimize any surface area that would be subject to a 3D scan.

Another issue in generating a 360° spin representation is to obtain uniform lighting. To address this issue, a content author 240 may use a computer numerical control (CNC) boom to hold a camera and primary lighting. The object to be scanned may be in a light box with standalone lights, but a primary light may be held by the boom holding the camera. In this way, as the CNC boom is programmed to capture a series images of the object while revolving about the object, the primary light on the boom provides a constant lighting contribution.

Turning to back to FIG. 5, in block 504, once the model data sources have been generated or received from third parties, the data is extracted from the data sources. In block 506, the data is voxelized, or converted into voxels. As used herein, a voxel is a volumetric pixel, which is the 3D analogue for a 2D pixel.

In block 508, at least some subset of the voxelized data is selected for a point cloud corresponding to the object. The voxelized data may optionally be used to generate a virtual 3D mesh for the object. The 3D mesh is a computerized wireframe of the surface of the object. The mesh is used to project images, lighting, and other image data to generate the 3D graphical likeness of the object.

In block 510, with the point cloud and other generated data, the data is finally consolidated into a model. As previously described above, a model may comprise, an object file, a mesh, a series of images, other maps, and other assets used to generate a virtual image of the object.

In block 512, model specific graphical corrections may be performed based on corrective input from the content author 240 or auto error correction software. This may be a potential time bottleneck. The graphical corrections may remedy multiple issues or errors. Errors during 3D scan may yield mesh errors and a bad topology. Such errors may be corrected by hand, or automatically detected. For example, scans of similar products could be compared to flag areas that are different. For example a scan of a first shoe, known to be correct could be compared to a second shoe. If the second shoe indicates a spike not in the first shoe, the spike may be flagged as an anomaly. In such cases the spike could turn out to be a mount that was inadvertently scanned, and the content author 240 may remove the spike.

In other instances, images may be misaligned when added to a mesh. Typically a series of 2D images taken of the object are projected onto the 3D mesh. However, sometimes 2D images do not project properly on the mesh. Software may scan the borders of objects and automatically seek misalignments. For example, a standardized scan of a tailored shirt would expect seam lines around pockets, the collar, and the sides of the shirt. Software could scan for broken seams in the model indicated misaligned images.

In addition to potential misalignment, different 2D images projected onto a mesh may have been captured with slightly different lighting causing non-matching color. As described above, software may scan the borders and overlaps of 2D images and test for non-matching color. Where detected, the colors may be blended on the model or the original 2D images changed.

Further, 3D scans only capture the shape of an object. In order to make a photorealistic model, a content author 240 may build a specular map from the data. The specular map would capture the lighting properties of the object, in particular the shininess/reflectiveness of the object. In general, pictures taken of the object could be used to extract material properties of the object. Once the model has been corrected, it may be used as virtual image.

In block 514, image augmentation may be optionally performed based on augmentation inputs from the content author 240. For example, if the object is something that might be printed locally, such as with a 3D printer, the content author may wish to add mounting to the object.

Furthermore, the content author 240 may opt to provide image provenance or versioning in block 516. Metadata for image provenance is used when using third party data sources, where copyright and other image ownership is to be tracked. Versioning is used to track iterations of the model itself. As time goes on, the model is likely to undergo modifications and corrections. Such modifications and corrections may be tracked by a versioning data.

User Experience Process for Augmented Reality E-Commerce

Figure 6:
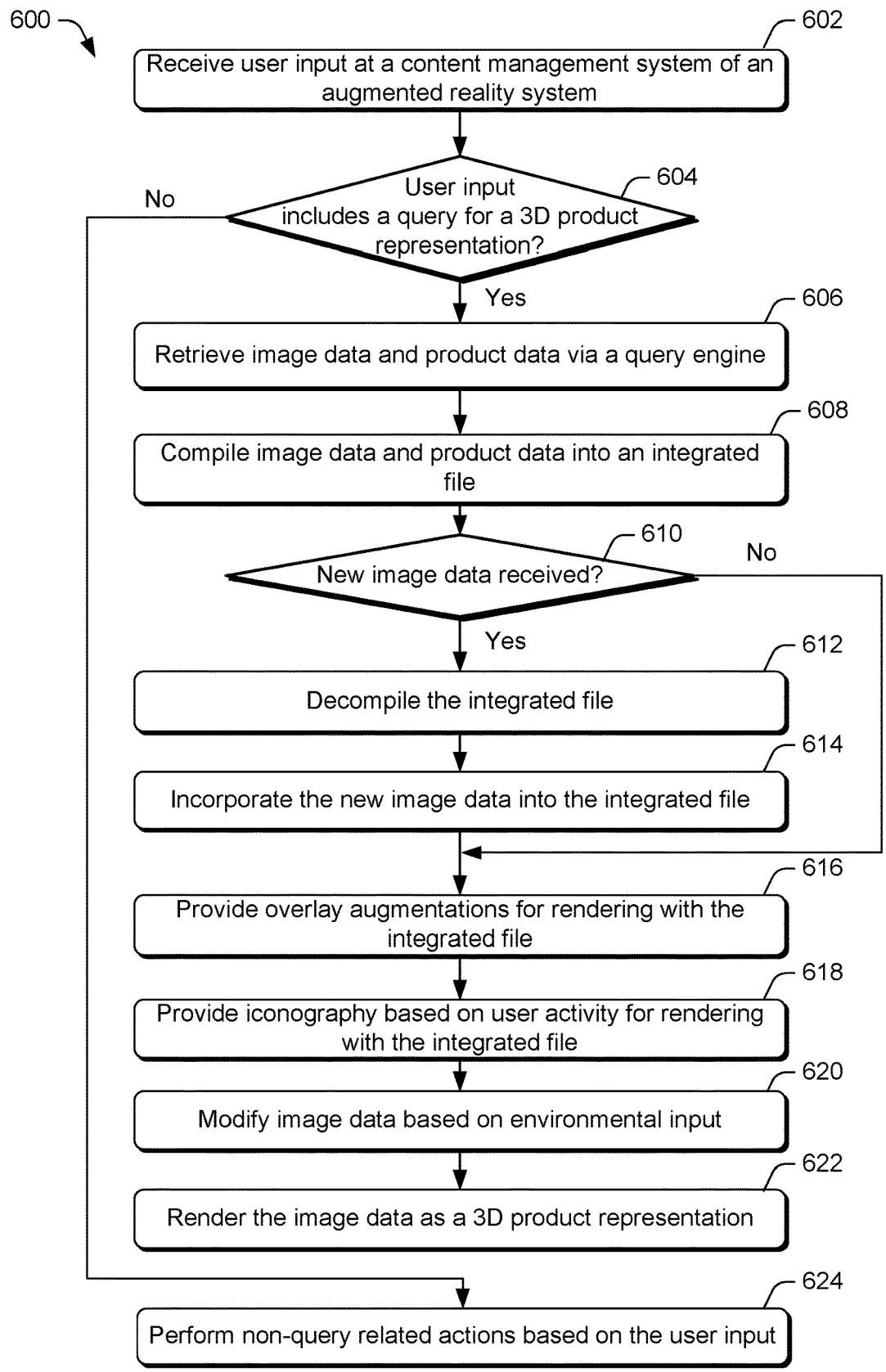
FIG. 6 is an exemplary user experience process for augmented reality e-commerce.

FIG. 6 is an exemplary user experience process 600 for augmented reality e-commerce. At block 602, the web service 214 may receive user input from a user as captured by the input devices 204. The input devices 204 may include cameras, microphones, touch surfaces, wearable sensors, or other sensing devices that are configured to capture motions or actions of the user. For example, the user input may include specific gestures made by the user via the user's arms or hands, gestures made using the fingers (e.g., a pinch command), selection of virtual icons, and/or voice commands. In some embodiments, the input devices 204 may be configured to capture motions or actions that are performed by persons with disabilities. Such motions or actions may include movement of facial features (e.g., winking of eyes, twitching of facial muscles), blowing of air through a person's mouth in specific patterns, movement of limbs or head in particular ways, and/or so forth. In some embodiments, the input devices 204 may have logic to translate such inputs into commands. Such commands are then passed by the input device 204 to the web service 214.

At decision block 604, the web service 214 may determine whether the user input includes a command to perform a query for a particular 3D product representation. In various embodiments, the web service 214 may include command processing logic that recognizes query commands. For example, the input devices 204 may translate a touch gesture or a voice command regarding a particular product into a command. In turn, the command may be recognized by the command processing logic of the web service 214 as a query command Thus, if the user input is recognized at decision block 604 by the web service 214 as a query command, the process 600 may proceed to 606.

At block 606, the web service 214 may pass the query command to the query engine 220 of the content management system 216. In turn, the query engine 220 may determine image data and product data that are to be retrieved in response to the query command. In various embodiments, the web service 214 my pass the query command to the query engine 220 via an API call, such as one of the API calls 218. The query engine 220 may parse the query command to determine a 3D product representation of a product that is to be retrieved.

Upon making such a determination, the query engine 220 may retrieve image data for the selected 3D product representation. For example, the query engine 220 may retrieve the image data from the virtual image data store 222. The image data for the product may be linked to the product data for the product. The linkage may be through a common product identifier, such as a UPC that is shared by the image data and the product data. The product data may include audio product data, multimedia product data, product identification information, product specifications, product inventory information, product price information, product shipping information, and/or so forth. The product data may be retrieved by the query engine 220 from the product data store 224.

At block 608, the content management system 216 may compile the image data and the product data that are retrieved by the query engine 220 into an integrated file. The compilation into the integrated file may service to obfuscate the content of the file. For example, the content management system 216 may use a compilation tool, such as the compileJS( ) API call, to perform the compilation of the integrated file.

At decision block 610, the content management system 216 may determine whether new image data is received. In various embodiments, the content management system 216 may receive new image data as part of a general update to the virtual image data store 222 or a specific update to the image data for the product that is the object of the query command. For example, the new image data may be a correction to the existing image data or additional image data that is previously unavailable for the product. Accordingly, if the content management system 216 determines that new image data is received, the process 600 may proceed to block 612.

At block 612, the content management system 216 may decompile the integrated file for the product that is the object of the query command. The content management system 216 may use the compilation tool or an equivalent software tool that is compatible with the compilation tool to decompile the integrated file. The de-compilation of the integrated file may once again expose the image data and the product data.

At block 614, the content management system 216 may incorporate the new image data into the integrated file. In various embodiments, the integration may be performed with the supplementation of the image data with the new image data. For example, if the image data is stored in the form of multiple data files that are catalogued via a master file list, then the name of a new file that includes the new image data is placed in the master file list. However, if the image data is a single data file, then the new image data may be appended to the data file at the end of the existing image data, or appended at one or more appropriate places in the data file. Once the new image data and the existing image data are merged, the content management system 216 may use the compilation tool to compile the image data and the product data into an integrated file. Subsequently, the content management system 216 may transmit the integrated file to the rendering devices 206.

In some embodiments, the incorporation of the new image data into the integrate file may be performed by a rendering device, such as one of the rendering devices 206. In other words, the content management system 216 may offload this task to the rendering device. The rendering device may perform such incorporation after receiving the integrated file and the new image data from the content management system 216. In such embodiments, the rendering device may be equipped with de-compilation and compilation tools, as well as processing logic for performing the incorporation of the new image data into the integrated file. Returning to decision block 610, if the content management system 216 determines that no new image data is received, the CMS may directly transmit the integrated file to the rendering device 206.

At block 616, the content management system 216 may provide augmentations that are to be rendered along with the integrated file to the rendering devices 206. The augmentations may include points of interest, color swatches, visual textures, and additional product information. The augmentation may be provided in the form of an augmentation data file to the rendering devices 206. The points of interest may be selectable features that are overlaid onto a 3D product representation. The selectable features may further explain or highlight specific features of the product. For example, when a user selects a particular point of interest, additional details regarding a specific feature may be rendered or displayed as part of the 3D product representation. In some embodiments, the content management system 216 may tailor the points of interest to a user based on user profile information, such as prior purchase history, prior product browsing history, user demographic information, user social media expressions, and/or so forth. For example, the social media expressions of the user may indicate that the user dislike certain features. As a result, points of interest that correspond to these features may be excluded from being rendered.

The color swatches may be rendered as a part of the 3D product representation. The color swatches may serve to provide additional color options for a product that may capture the interest of the user. For example, a 3D product representation for a footwear may have a default color. In such a scenario, the color swatches may be selected to modify the default color into other colors. Likewise, the visual textures may be rendered as a part of the 3D product representation. The visual textures may serve to provide additional visual options for the product that may appeal to the user. For example, textures such as stainless steel, wood, polished aluminum, leather, chrome, and brushed nickel may be texture options that are selected and rendered for different aspects of the 3D product representation.

Additional product information may be rendered with the 3D product representation to inform the user. In various embodiments, the additional product information that is provided by the content management system 216 may be localized for the user. For example, the additional product information may be a translation of a product name or product description that is displayed according to the geographical region from which the user is viewing the representation. The geographical region may be determined via a global position system (GPS) locator, an IP address of the rendering devices 206, cellular triangulation, and/or other technologies. The additional product information may also be localized to meet governmental regulations and standards. For example, the additional product information may include health warnings, manufacturing information, usage information, or other appropriate labeling data. Other product information that may be rendered with the 3D product representation may include product reviews, product ratings, related products, user comments, associated social media trends, and/or so forth.

At block 618, the content management system 216 may provide iconography for rendering with the 3D product representation to the rendering devices 206. The iconography may be provided based on user activity, and can be provided in the form of an iconography file that can be rendered along with the 3D product representation. The iconography files may be as the iconography data store 226. For example, the content management system 216 may be aware that the user has looked at the 3D product representation several times in the past or has placed the 3D product representation in a virtual holding place. Accordingly, the content management system 216 may provide iconography in the form of a virtual buy button that is to be displayed with the 3D product representation. In some instances, the virtual buy button may be accompanied by a custom tailored discount offer to further encourage the user to make the purchase. In another example, the content management system 216 may be aware that the user has been looking for a product with a particular feature. Accordingly, the content management system 216 may provide iconography in the form of virtual highlighting (e.g., semi-transparent amber overlay) that draws the attention of the user to a particular feature shown in the 3D product representation.

At block 620, the content management system 216 may command shaders on the rendering devices 206 to modify the way in which they present the image data based on environmental input. In various embodiments, the shaders may augment the image data with occlusions, reflections, refractions, and/or other visual effects. Such modification may enable the rendering device 206 to present the 3D product representation in an enhanced virtual reality or an augmented reality. In such embodiments, the input devices 204 may include cameras and/or wearable locators that detect the eye position, orientation, and movement of the user. Input devices such as cameras and scanners may also detect and map the placement of objects in a real environment. The cameras may further detect lighting conditions, which may light source positions, light level, light temperature, and/or other lighting parameters in the real environment. Based on these inputs, the rendering devices 206 may modify the image data of the product for presentation in an augment reality that is visible through the real environment, or for presentation in a virtual reality that simulates the real environment. For example, occlusion includes hiding certain surfaces of an image from view, reflection is the duplication of at least a portion of image to simulate optical effects, and refraction is the splitting of light into its constituent waves.

At block 622, the rendering devices 206 may use the shaders to render the image data into a 3D product representation, as well as render the augmentations for the 3D product representation. The rendering device 206 may render the 3D product representation into a rendered augmented reality environment or a rendered virtual reality environment. In various embodiments, the rendering devices 206 may implement one or more optimizations for the rendering. In some embodiments, the shaders may be configured to skip the rendering of image data for visual surfaces that are blocked by other visual surfaces or objects in the foreground. In other embodiments, the rendering devices 206 may pre-rendering certain image data (e.g., the background of the virtual reality environment) to speed up the rendering process.

Returning to decision block 604, if the user input is not recognized by the web service 214 as a query command, the process 600 may proceed to 624. At 624, the web service 214 may parse a non-query related user command from the user input and process the user command accordingly. For example, if the user command is a command to rotate or manipulate a rendered 3D product representation, the web service 214 may pass the command to the rendering devices 206. In some embodiments, the manipulation may be performed with a locked field of view so that the 3D product representation may be presented from the correct perspective. However, if the user command is a purchase command, the web service 214 may process the purchase transaction for the product that is represented by the 3D product representation.

Augmented Reality E-Commerce Use Cases

Figure 7:
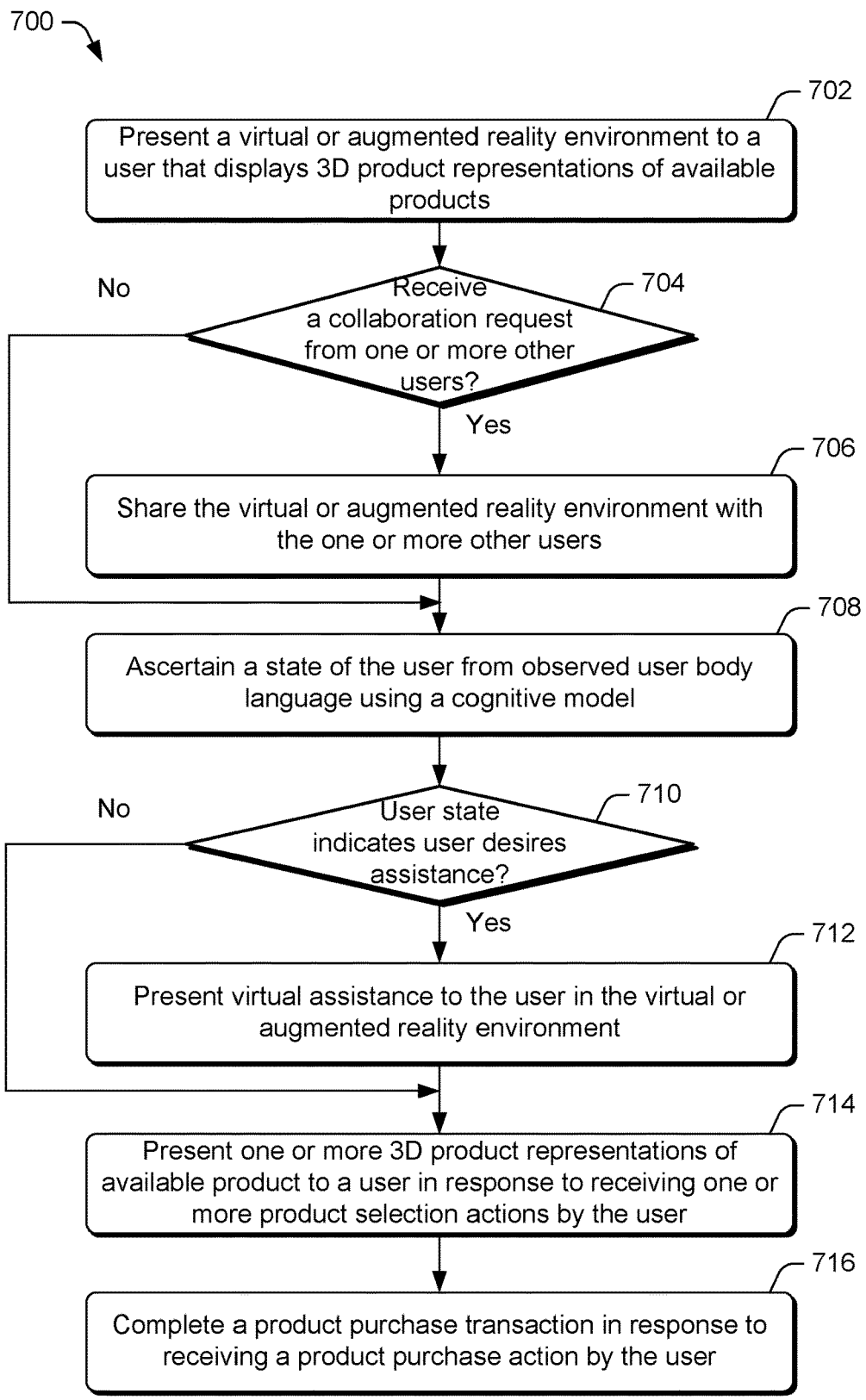
FIG. 7 is an exemplary search process for augmented reality e-commerce.

FIG. 7 is an exemplary search process 700 for augmented reality e-commerce. At block 702, the web service 214 may present a virtual or augmented reality environment to a user that displays 3D product representations of available products. The web service 214 may present the environment by sending virtual or augmented reality image data, product image data, and product data from the content management system 216 to the rendering devices 206. The image data and the product data may be sent from the content management system 216 to the rendering device 206 via the web service 214. The 3D product representations may be presented in a way that enables a user to browse and learn about the available products. In some embodiments, the 3D product representations may be presented as a cover flow. The cover flow may enable the user to sweep through the 3D product representations via user inputs to the input devices 204. The cover flow may provide the user with an experience of flipping through the products. The user inputs may include gestures, voice commands, body movements, facial expressions, selection of virtual icons, etc. In other embodiments, the 3D product representations may be presented via other sequential data presentation techniques, such as a slideshow.

The 3D product representations of products may be displayed in the cover flow or other sequential presentation according to the amount of slotting fees paid by each product vendor or manufacturer. For example, the cost of placing a 3D product representation at a beginning or end of a sequential presentation may be higher, as users typically remember objects at the beginning or end of a sequence better than objects that are in the middle of the sequence. In another example, 3D product representations that are visually prominent may cost more in terms of slotting fee than other 3D product representations. A 3D product representation may be made more visually prominent because of its size, color, resolution, description, etc. relative to such characteristics of the other 3D product representations.

In various embodiments, the 3D product representations may be presented with product data. Such product data may include price information, brand information, and/or user generated content. The user generated content may include product reviews, product commentaries, user product ratings, as well as other user generated information. Such user generate content may assist the user in learning more about the products, evaluating the products, and making purchase decisions with respect to the products.

At decision block 704, the web service 214 may determine whether a collaboration request is received from the one or more other users. A collaboration request may initiate a session in which an additional user is able to share in the same virtual reality or augmented reality experience with the user. Accordingly, the additional user may view the same the 3D product representations in the same environment. In some embodiments, the additional user may also have the same ability to control the flow and manipulation of the 3D product representations. According, if the web service 214 determines that one or more collaboration requests are received at decision block 704, the process 700 may proceed to block 706.

At block 706, the web service 214 may initiate a sharing of the virtual or augmented reality environment with the one or more additional users. In various embodiments, the web service 214 may prompt the rendering devices of each additional user to retrieve the appropriate virtual or augmented reality environment data, product image data, and product data from the content management system 216 for presentation. The virtual or augmented reality environment may be fully interactive, such that each additional user may communicate with the user in the environment, as well as control the 3D product representations using corresponding input devices. The virtual or augmented reality environment data may also include avatar image data, such that the user may see a virtual or an augmented representation of the additional user, and vice versa. However, if the web service 214 determines that no collaboration requests are received, then the process 700 may proceed directly to block 708.

At block 708, the web service 214 may ascertain a state of the user from observed body language. The observed body language may include facial expressions, body movements, hand gestures, and/or so forth. The web service 214 may receive the body language through the input devices 204. In some embodiments, the web service 214 may process the body language using a cognitive model to determine the state of the user. The state of the user may be one of contentment, sadness, frustration, displeasure, anger, happiness, etc. In other embodiments, the web service 214 may process the body language using other forms of machine learning and classification techniques. For example, a classifier may be trained using various approaches, such as supervised learning, unsupervised learning, semi-supervised learning, naïve Bayes, Bayesian networks, decision trees, neural networks, fuzzy logic models, and/or probabilistic classification models to determine the state of the user.

At decision block 710, the web service 214 may determine whether the state of the user indicates that the user desires assistance. In various embodiments, assistance may be triggered if the detected state of the user is one of frustration, displeasure, anger, or some other relevant state. Thus, if the web service 214 determines that the user desires assistance, the process 700 may proceed to block 712.

At block 712, the web service 214 may present the virtual assistance to the user in the virtual or augmented reality environment. The web service 214 may provide the virtual assistance by providing image data, audio data, and multimedia data from the content management system 216 for presentation by the rendering devices 206 to the user. The virtual assistance may be provided by an automated avatar assistant that is programmed to respond to voice queries from the user with machine generated answers. Alternatively, the virtual assistance may be provide by a virtual representation of a real human assistant who is able to offer help and guide the user. In still other embodiments, the web service 214 may initially provide automated assistance, but escalates to real human assistance if the automated assistance is unable to provide the user with a satisfactory resolution. However, if the web service 214 determines that no user assistance is desired at decision block 710, the process 700 may proceed directly to block 714.

At block 714, the web service 214 may receive a product selection action by the user. In various embodiments, the user may make a product selection via an interaction with the corresponding 3D product representation that is sequentially presented. For example, the user may select the product by making a pinch gesture on the 3D product representation or virtually touching the 3D product representation. In turn, the web service 214 may present an in-depth version of the 3D product representation. The in-depth version of the 3D product representation may include additional features or show more information than the initial representation. These features and information may include augmentations (e.g., selectable points of interest, selectable textures and colors, iconography), supplementary descriptions, and custom tailored offers. The web service 214 may present the in-depth version based on data retrieved from the content management system 216. The user may manipulate and view the 3D product representation using different angles, perspectives, zoom factors, lighting conditions, alternative views, etc. For example, if the user is looking at a vehicle, the alternative view includes additional accessories that may be installed on the vehicle. Likewise, colors may be overlaid on the 3D product representation to show alternative color options.

The rendering devices 206 may include a haptic feedback device that is able to provide haptic feedback with respect to the physical textures of a product represented by a 3D product representation. The haptic feedback information may be stored in the haptics data store 232. For example, the haptic feedback device may be a glove or another article of clothing worn by the user. In at least one embodiment, the haptic feedback device is able to provide physical texture feedback using electrical impulses. The haptic feedback device may simulate physical textures that have various degrees of smoothness, roughness, temperature, etc. In some instances, the haptic feedback device may also provide force feedback to simulate product response to manipulation. For example, bending the sole of a virtual shoe may cause the haptic feedback to simulate the elasticity of the sole and the ability of the sole to return to its original shape. In various embodiments, the web service 214 may receive multiple product selection actions and provide corresponding in-depth versions of the 3D product representations and feedback.

The presentation of the in-depth 3D product representations may involve the use of a virtual mirror. In some embodiments, the virtual mirror may be implemented using rendering devices (e.g., a 3D display) that presents a virtual representation of the user with the product. For example, if the product is a piece of clothing, input devices 204 may capture a 3D virtual likeness of the user. The web service 214 may then graft the 3D representation of the clothing onto the 3D virtual likeness of the user for display by the rendering devices. In this way, the user may be free to view product and the virtual likeness from multiple angles (e.g., 360° degree spin), in order to make a purchase decision.

In other embodiments, the virtual mirror may be implemented using rendering devices in the form of 3D display goggles or helmet. The 3D display goggles or helmet may be equipped with input devices in the form of cameras that capture a real-time image of the user. In such embodiments, the web service 214 may digitally enhance or augment the real-time image of the user so that the 3D display goggles or helmet are digitally erased from the user's head. Such digital enhancement or augmentation may be perform using a 3D image of the user's head from when the user is not wearing the 3D display goggles or helmet. This implementation, which uses 3D display goggles or helmet, may enable the user to look at the 3D likeness of the user with the 3D representation of the product in a virtual mirror, as well as look at the user's own body with the product in an augmented reality view. For example, if the 3D representation is that of a pair of shoes, the user may be able to see a 3D image of himself wearing the 3D representation of the shoes in the virtual mirror, as well as look down to see the 3D representation of the shoes on his or her own feet.

At block 716, the web service 214 may receive a product purchase action from the user. The user may make the purchase action by making a predetermined gesture, such as virtually pressing a virtual buy button that is instantiated with the 3D product representation of the product. The gesture may be capture by the input devices 204 and transmitted to the web service 214. In turn, the web service 214 may initiate and complete a product purchase transaction for the product.

In some instances, the product being purchased by the user may not be a product that the user is looking at in a current purchase session. Instead, the product may be a something that the user looked at previously and virtually saved in the virtual or augmented reality environment. In one scenario, the virtual or augmented reality environment may include virtual holding place where the user can store 3D product representations of interest (e.g., products that the user is contemplating to purchase). Accordingly, the user is able to retrieve a 3D product representation and purchase the corresponding product in the same manner as other products. In some embodiments, special offers or discounts may be sent to the user by the web service 214 on behalf of manufacturers or vendors in the virtual or augmented reality environment to further motivate the user to make a purchase.

The purchase transaction may be completed using various transaction instruments, such as a credit card, a debit card, an electronic checking account, a gift card, a digital wallet, etc. Data related to such transaction instruments may be stored in the iconography data store 226. The web service 214 may use a transaction engine to process the purchase transaction. Subsequently, the product may be electronically delivered to the user if the product is a virtual or non-tangible good. Otherwise, if the product is a physical good, then the product may be physically delivered to the user or picked up by the user. In some embodiments, the transaction engine used by the web service 214 may implement security measures with respect to the purchase transaction. For example, the transaction engine may cause an input device in the form of a camera to obtain a scan of the user's face, or a retinal scanner to obtain a scan of the user's eye. The transaction engine may then authorize the transaction if a scan match stored scan data belonging to the user. Other security measures concurrently or alternatively implemented by the transaction engine may include the input of correct security codes, passwords, personal identification numbers (PINs), etc.

The transaction engine may also implement purchase transaction security through the use of behavior data as stored in the cross reference data store 230. In such implementations, the transaction engine may flag purchase attempts that do not fit existing user behavior patterns or user profile information as potentially fraudulent. For example, a purchase of a product for delivery to a different part of the country may be flagged. In another example, a purchase of accessories for a product that the user does not own may also trigger a flag. The transaction engine may enable the user to confirm a flagged purchase transaction via additional user authentication, such as telephone, web, or email based identity verification. Through the use of these behavior-based security measures, the transaction engine may prevent or mitigate identity theft and fraudulent purchases. The transaction engine may also support auditing functions, such as the viewing of purchase histories, payment histories, delivery histories, etc. by the user and other authorized parties.

The web service 214 may record aspect of the user browsing, selection, and/or purchase experience for replay by the user or another authorized party. In some implementations, the user may desire to review the various features of the product that the user browsed. Accordingly, the user may select a virtual record feature that is present by the web service 214 in the virtual or augmented reality environment to record a manipulation of the 3D product representation. Subsequently, the user may reactivate the virtual or augmented reality environment and replay the manipulation of the 3D product representation via a replay option. In other implementations, the user may desire the share a browsing and/or purchase experience with another user. The web service 214 may once again be activated to record the manipulation of the 3D product representation, which may include a purchase of the corresponding product. The recorded data file may be shared with another user, and the other user may view the recorded data file in a virtual or augmented reality environment as a replay of the user's experience.

Analytics for Augmented Reality E-Commerce

The analytic engine 238 may track user browsing and manipulations of 3D product representations as well as the user purchases of the products represented by the 3D product representations. The tracked information may be stored as a part of the analytics data 236. The tracking of user manipulation of the 3D product representation may include tracking the orientations, scales, and/or directions at which the user viewed the 3D product representation, as well as user facial features and gestures used during the manipulation. Camera angle with respect to the 3D product representation, user dwell time at each of the orientation, scale, angle, and/or direction, features or descriptions selected or view are also tracked. The tracking of user purchase information may include the purchase price, the number of times the user viewed the 3D product representation before making a purchase of the product, offers or incentives associated with the purchase, and/or so forth. Accordingly, the analytic engine 238 may generate metrics based on the tracked information.

In various embodiments, the metrics may indicate what aspects of the 3D experience was difficult for the user to understand. For example, a user repeatedly selecting a virtual control in the virtual or augmented reality environment within a predetermined time period may indicate that the user is unclear as the functionality of the virtual control. The metrics may indicate products that most captures each user's interest. Such metrics may be determined based on a frequency that views particular 3D product representations, dwell time on specific 3D product representations, whether the user saved a 3D product representation for later viewing, and/or so forth. Conversely, the metrics may also indicate the dislikes of users. For example, a 3D product representation that is placed prominently in a cover flow for a user in which the user never views may be an indicated that the user dislikes the product. In another example, one or multiple instances in which user gestures or facial impressions show frustration or anger while viewing a 3D product representation may also indicate that the user dislikes the corresponding product.

The metrics may also reveal the actual driving force in the user making a purchase. For example, the metrics may indicate that average user dwell time and/or purchases by a group users on a 3D product representation increased or decreased after a change. The change may be the additional or removal of certain image data, overlaid information, or iconography from the 3D product representation. The metrics may also show the most frequently viewed 3D image, description, or augmentation prior to purchase of a product by a group of users. Such statistics may be used to increase or maintain the number of sales for a product.

The analytic engine 238 may also provide replay of the user experiences with the 3D product representations. The replays may be performed per user, per product, or per purchase. The replay of the purchase decisions of the individual users may serve to visually identify common patterns in the purchase decisions as well as the visual imagery that may have motivated the purchase decisions.

The analytic engine 238 may also show points of interest in the 3D product representations that are viewed or ignored by the users. By collecting viewership statistics across a group of users and cross referencing this information with purchase data, the analytic engine 238 may identify points of interests that do not contribute to purchases or otherwise distracting users from making purchases. Further, the analytic engine 238 may identify points of interest that are to be removed. For example, a point of interest regarding a product that is ignored by a predetermined percentage of users who purchased the product may be removed from presentation by the analytic engine 238. The removal of a point of interest for a product may provide an opportunity for the addition of another point of interest for the product. The point of interest to be added may be similar to a point of interest that has worked well for a comparable product (e.g., viewed by a predetermined percentage of users that purchased the comparable product). In some embodiments, the analytics engine 238 may automatically relay the points of interest removal and addition instructions to the web service 214.

In some embodiments, the analytic engine 238 may use the tracked information to provide recommendations of additional products to users. For example, if a user prefers goods of a particular manufacturer, type, style, price point, brand, etc., the analytics engine 238 may communicate this information to the web service 214. In turn, the web service 214 may provide recommendations of similar products to the user during a subsequent visit of the virtual or augmented reality environment by the user. The analytic engine 238 may also use the tracked information to recommend a virtual reality environment to the user based on the user's product purchases. For example, the analytics engine 238 may recommend to a user that buys traditional furniture items a virtual environment that resembles a Tudor-style private study, while a user that purchases modern furniture items may be recommend an industrial loft style virtual environment. The analytic engine 238 may provide such recommendation to the web service 214 for implementation using 3D image data upon approval of the user.

Further, the analytics engine 238 may compare the user return visit rate or conversion rate for purchases made as result of 3D experiences in a virtual or augmented reality environment to purchases that result from other sales techniques. Based on such comparison, the analytic engine 238 may generate metrics and statistics that show the effectiveness of the virtual or augmented reality environment in promoting products. The metrics and statistics may show comparisons of time to conversion, impressions per conversion, cost per conversion, customer visit gain or loss rate, and/or so forth. In some instances, such metrics may be used to sign up additional manufacturers or vendors for the 3D virtual or augmented reality e-commerce platform.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more non-transitory computer-readable media storing computer-executable instructions that upon execution cause one or more processors to perform acts comprising:
   receiving data for a particular version of a product that includes one or more 2-dimensional (2D) images of an object;

voxelizing the one or more 2D images into voxels that are 3-dimensional (3D) analogues of 2D pixels in the one or more 2D images of the object;

selecting at least a subset of the voxels to produce a point cloud for the object;

generating a virtual 3D wireframe of a surface of the object from the voxels;

consolidating at least the point cloud and the virtual 3D wireframe into a virtual model that includes virtual image data for the particular version of the product;

storing the virtual image data for the particular version of the product into a virtual image data store that stores virtual image data for different versions of the product;

retrieving the virtual image data for the particular version of the product from the virtual image data store and product data for the product from a product data store in response to a query for a 3D product representation of the particular version of the product that is initiated from within an augmented reality environment as presented by a rendering device;

compiling the virtual image data as retrieved for the particular version of the product from the virtual image data store and the product data as retrieved for the product from the product data store into an integrated file for the particular version of the product that is configured to be rendered into the 3D product representation of the particular version of the product in the augmented reality environment, the product data of the particular version of the product as compiled into the integrated file including one or more points of interest that are to be overlaid onto the 3D product representation rendered via the integrated file; and transmitting, to the rendering device, the integrated file that is compiled from the virtual image data for the particular version of the product and the product data for rendering of the 3D product representation of the particular version of the product into the augmented reality environment, the 3D product representation as rendered being overlaid with the one or more points of interest.

2. The one or more non-transitory computer-readable media of claim 1, wherein the query is initiated by a user input that is a specific user gesture, a selection of a virtual icon, a voice command, or a facial movement that is detected by an input device.

3. The one or more non-transitory computer-readable media of claim 1, wherein a point of interest is selectable by a user to cause a display of additional details regarding a specific feature of the product along with the 3D product representation in the augmented reality environment.

4. The one or more non-transitory computer-readable media of claim 1, wherein a point of interest is tailored to a user of the rendering device based on at least one of a purchase history, a prior product browsing history, user demographic information, or a social media expression of the user.

5. The one or more non-transitory computer-readable media of claim 1, wherein the acts further comprise removing a point of interest from the product data to preclude the point of interest from the being overlaid on the 3D product representation in response to determining that the point of interest either fails to cause or distracts a plurality of users from purchasing the product.

6. The one or more non-transitory computer-readable media of claim 1, wherein the acts further comprise removing a point of interest from the product data to preclude the point of interest from being overlaid on the 3D product representation in response to determining the point of interest is ignored by a predetermined percentage of users who purchased the product.

7. The one or more non-transitory computer-readable media of claim 6, wherein the determining that the point of interest is ignored includes cross reference viewing statistics for the point of interest with purchase data for the product.

8. The one or more non-transitory computer-readable media of claim 1, wherein the acts further comprise adding a point of interest to be overlaid on the 3D product representation to the product data in response to determining that a similar point of interest for a comparable product is viewed by a predetermined percentage of users who purchased the comparable product.

9. The one or more non-transitory computer-readable media of claim 1, wherein the product data further includes at least one of pricing data, branding data, slideshow data, scene data, and third party data.

10. A computer-implemented method, comprising:

receiving data for a product that includes one or more 2-dimensional (2D) images of an object;

voxelizing the one or more 2D images into voxels that are 3-dimensional (3D) analogues of 2D pixels in the one or more 2D images of the object;

selecting at least a subset of the voxels to produce a point cloud for the object;

generating a virtual 3D wireframe of a surface of the object from the voxels;

consolidating at least the point cloud and the virtual 3D wireframe into a virtual model that includes virtual image data for the product;

storing the virtual image data for the product into a virtual image data store;

retrieving the virtual image data for the product from the virtual image data store and product data for the product from a product data store, in response to a query for a 3D product representation of the product that is initiated from within an augmented reality environment as presented by a rendering device;

compiling the virtual image data as retrieved for the product from the virtual image data store and the product data as retrieved for the product from the product data store into an integrated file for the product that is configured to be rendered into the 3D product representation of the product in the augmented reality environment, the compiling includes performing an obfuscation that obfuscates the virtual image data and the product data of the product as retrieved from the virtual image data store and the product data store; and transmitting, to the rendering device, the integrated file that includes obfuscated virtual image data and obfuscated product data of the product for rendering of the 3D product representation of the product into the augmented reality environment.

11. The computer-implemented method of claim 10, wherein the query is initiated by a user input detected by an input device, the user input including a specific user gesture, a selection of a virtual icon, a voice command, or a facial movement.

12. The computer-implemented method of claim 11, wherein the input device includes at least one of a camera, a microphone, a touch surface, or a wearable sensor.

13. The computer-implemented method of claim 10, wherein the virtual image data includes at least one of object files, rigging, meshes, textures, or shaders.

14. The computer-implemented method of claim 10, wherein a point of interest is tailored to a user based on at least one of a purchase history, a prior product browsing history, user demographic information, or a social media expression of the user.

15. The computer-implemented method of claim 10, further comprising removing a point of interest from the product data to preclude the point of interest from being overlaid on the 3D product representation in response to determining that the point of interest either fails to cause or distracts a plurality of users from purchasing the product.

16. The computer-implemented method of claim 10, further comprising removing a point of interest from the product data to preclude the point of interest from being overlaid on the 3D product representation in response to determining the point of interest is ignored by a predetermined percentage of users who purchased the product.

17. The computer-implemented method of claim 10, further comprising adding a point of interest to be overlaid on the 3D product representation to the product data in response to determining that a similar point of interest for a comparable product is viewed by a predetermined percentage of users who purchased the comparable product.

18. A system, comprising:
one or more processors; and
memory including a plurality of computer-executable components that are executable by the one or more processors to perform a plurality of actions, the plurality of actions comprising:
receiving data for a particular version of a product that includes one or more 2-dimensional (2D) images of an object;
voxelizing the one or more 2D images into voxels that are 3-dimensional (3D) analogues of 2D pixels in the one or more 2D images of the object;
selecting at least a subset of the voxels to produce a point cloud for the object;
generating a virtual 3D wireframe of a surface of the object from the voxels;
consolidating at least the point cloud and the virtual 3D wireframe into a virtual model that includes virtual image data for the product;
storing the virtual image data for the particular version of the product into a virtual image data store that stores virtual image data for different versions of the product;
retrieving the virtual image data for the particular version of the product from the virtual image data store and product data for the product from a product data store in response to a query for a 3D product representation of the particular version of the product that is initiated from within an augmented reality environment as presented by a rendering device;
compiling the virtual image data as retrieved for the particular version of the product from the virtual image data store and the product data as retrieved for the product from the product data store into an integrated file for the particular version of the product that is configured to be rendered into the 3D product representation of the particular version of the product in the augmented reality environment, the product data of the particular version of the product as compiled into the integrated file including one or more points of interest that are to be overlaid onto the 3D product representation rendered via the integrated file; and
transmitting, to the rendering device, the integrated file that is compiled from the virtual image data for the particular version of the product and the product data for rendering of the 3D product representation of the particular version of the product into the augmented reality environment, the 3D product representation as rendered being overlaid with the one or more points of interest.

19. The system of claim 18, wherein a point of interest is selectable by a user to cause a display of additional details regarding a specific feature of the product along with the 3D product representation in the augmented reality environment.

20. The system of claim 18, wherein the query is initiated by a user input that is a specific user gesture, a selection of a virtual icon, a voice command, or a facial movement that is detected by an input device.

\* \* \* \* \*